United States Patent Office 3,573,297
Patented Mar. 30, 1971

3,573,297
METHOD FOR PRODUCING PURE
METHDILAZINE SULFOXIDE
Paul Merrill Lish, John H. Weikel, and Stanley J. Dykstra,
Evansville, Ind., assignors to Mead Johnson & Company
No Drawing. Original application Nov. 8, 1965, Ser. No.
506,872, now Patent No. 3,435,114, dated Mar. 25,
1969. Divided and this application July 2, 1968, Ser.
No. 765,717
Int. Cl. C07d 93/14
U.S. Cl. 260—243                                4 Claims

ABSTRACT OF THE DISCLOSURE

Process for preparing methdilazine sulfoxide in pure crystaline form.

---

This invention is a divisional of our application Ser. No. 506,872, filed Nov. 8, 1965, now U.S. Pat. 3,435,114, granted Mar. 25, 1969.

This invention is a division of our application Ser. its acid addition salts. These substances are provided for the first time in pure crystalline form suitable for pharmaceutical use. The invention also deals with specific compositions and processes for the use of these substances in the treatment of inflammatory and pruritic conditions of the skin and mucous membranes. The systematic chemical name for methdilazine sulfoxide is 10-(1-methyl-3-pyrrolidinylmethyl)phenothiazine-5-oxide. The structural formula is drawn below.

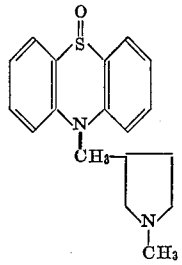

This substance has been identified by J. H. Weikel, Jr., et al. (Toxicology and Applied Pharmacology, 2, 68–82 (1960)) as a urinary metabolite of the drug methdilazine in the rat. Methdilazine is a well known antihistiminic-antipruritic drug which has been in use for a number of years and is the subject of U.S. Pat. No. 2,945,-855, dated July 19, 1960.

We have now prepared methdilazine sulfoxide in pure crystalline form and studied its pharmacological properties. We have found it to have substantially equivalent antihistamine action to that of methdilazine in classical animal tests, contrary to the published findings which indicate a much lesser potency. Moreover, we have found it to possess a number of advantages over methdilazine in that it possesses a narrower spectrum of pharmacologic action, freeing it of many undesirable side effects.

This pure antihistamine action particularly adapts methdilazine sulfoxide for topical use on the skin and mucous membranes, distinguishing it from methdilazine which has not heretofore been recommended for topical application. From this standpoint, methdilazine sulfoxide possesses the advantage of being substantially free of local anesthetic action and of being approximately ⅕ as irritating to the skin and mucous membranes as methdilazine. It is in fact substantially less irritating than the leading commercial topical antihistamine preparations, antazoline and methapyrilene.

One embodiment of this invention involves the process of alleviating pathological conditions of the skin and mucous membranes including dermatitis, pruritus, and allergic inflammation which comprises contacting methdilazine sulfoxide or a pharmaceutically acceptable acid addition salt thereof with the pathological tissue.

The term pharmaceutically acceptable acid addition salts is meant to include those salts in which the anion does not contribute significantly to the toxicity or pharmacological effect of the salt when employed in accordance with the present invention. Examples of suitable salts are the acetate, propionate, butyrate, pamoate, tannate, mucate, citrate, malate, ascorbate, tosylate, mesylate, phosphate, nitrate, sulfate, hydrobromide, hydroiodide, hydrochloride, etc.

A further embodiment of this invention involves the preparation of methdilazine sulfoxide and its salts in pure crystalline form, which has not been accomplished heretofore. A unique process for the isolation and purification thereof is described. This process makes possible the preparation of improved therapeutic compositions, which are now described. These include ointments, solutions, or suspensions containing methdilazine sulfoxide or a pharmaceutically acceptable acid addition salt thereof adapted for topical use.

FORMULATIONS

For topical use including use on the skin and on the mucous membranes of the eyes or nose, solutions, suspensions, ointments, and lotions are employed. Such compositions are, in a broad sense, all liquids. That is, they are comprised of a major proportion of a liquid pharmaceutical carrier and a minor proportion of methdilazine sulfoxide or a pharmaceutically acceptable acid addition salt thereof. The term liquid pharmaceutical carrier is intended to refer to not only solutions and suspensions including lotions which will pour, that is which have viscosities not substantially different from the water, aqueous solutions, or organic liquids employed as solvents or suspending media, but also to gels of high viscosity, including thixotropic gels, and plastic solids such as petroleum jelly which are used as ointment bases.

The term ointment base is used in the customary pharmaceutical sense to refer to oleaginous materials such as petroleum jelly, cetyl alcohol, and other hydrophobic fatty materials, non-oleaginous materials such as the polyethylene glycols and polyoxyethylene fatty acid esters which have water absorbing characteristics, and also to other types of plastic materials that are employed as ointment vehicles. The latter include viscous emulsions such as the cosmetic creams and vanishing creams having water as either the disperse or continuous phase, or of the invertible type, and also the so-called water base ointment vehicles such as the carbowaxes.

The term major proportion when used herein to refer to the amount of liquid carrier is meant more than 50% by weight. All ingredients of the composition employed other than for their pharmacological effect, that is ingredients other than the active ingredients, are considered as components of the vehicle for the purposes of this definition.

The term minor proportion used with reference to the methdilazine sulfoxide ingredient, of course, means less than 50% by weight. The preferred amount of methdilazine or pharmaceutically acceptable acid addition salt thereof used in the present compositions is from about 0.05% to about 10%.

For use in the eye, concentrations of methdilazine sulfoxide or its pharmaceutically acceptable salts of 0.05% to 10% or higher are applicable, due to the lack of irritancy and local anesthetic action. Similar solutions may be employed in the nose. Sterile buffered solutions having pH 6 to 7 are preferred. Ointments and lotions for topical use having concentrations of from 1% to 10% by weight of methdilazine sulfoxide are adapted for application to the skin in various allergic and pruritic conditions.

Ointments

The following ingredients, when compounded in accordance with good pharmaceutical practice and technique provide a topical ointment containing 5% of methdilazine sulfoxide.

|  | G. |
|---|---|
| Methdilazine sulfoxide | 50.0 |
| Stearic acid | 150.0 |
| Cetyl alcohol | 30.0 |
| Petrolatum, white | 10.0 |
| Ascorbyl palmitate | 0.10 |
| Polyoxy 40 stearate, U.S.P. | 80.0 |
| Sorbitol solution, U.S.P. | 70.0 |
| Methyl paraben | 1.20 |
| Propyl paraben | 0.30 |
| Disodium ethylenediaminetetraacetate | 0.025 |
| Ascorbic acid | 5.0 |
| Sulfuric acid, reagent grade, q.s. pH 4–5. | |
| Purified water q.s. 1000 | |

Ointments containing 1% and 10% of methdilazine sulfoxide can be prepared according to the same procedure by employing the appropriate amount of methdilazine sulfoxide, namely 10 g. or 100 g., in the same procedure.

Ophthalmic solution

A buffered, sterile, ophthalmic solution containing 0.5% of methdilazine sulfoxide is prepared from the following ingredients:

|  | G. |
|---|---|
| Methdilazine sulfoxide | 5.0 |
| Sodium biphosphate | 3.2 |
| Sodium phosphate, dibasic | 0.95 |
| Methyl cellulose, 400 M.C. | 3.0 |
| Phenylmercuric acetate | 0.02 |
| Distilled water, q.s. 1000 ml. | |

The solution is adjusted to pH 6.0 to 6.5 with sulfuric acid and sterilized by filtration through a bacterial filter prior to filling into ampoules.

Cutaneous irritation

Solutions of test compounds having various concentrations were injected intracutaneously into rabbits which were treated intravenously with 10 mg./kg. of Trypan Blue dye. The sites of injection were examined at intervals and assigned numerical scores of 0, 1, 2, 4, or 8 in proportion to the degree of blue color developed as a result of dye infiltration. The intensity of color was correlated with the severity of irritation. Concentration response curves for each compound were then prepared and the concentrations of the various drugs giving equivalent effects, namely an irritation score of 4, were interpolated from the curves. The results are listed in Table I.

TABLE I

Equivalent irritant solutions

| Compound: | Concentration (millimolar) |
|---|---|
| Methdilazine sulfoxide | 28.49 |
| Methdilazine | 4.2 |
| Antazoline | 12.59 |
| Methapyrilene | 24.87 |

It is evident that methdilazine sulfoxide is considerably less irritating than methdilazine and somewhat less irritating than antazoline and methapyrilene, two topical antihistamine drugs presently in common use. The latter two substances are substantially weaker in antihistiminic action than methdilazine sulfoxide.

In another test of irritancy, it was found that a 10% solution of methdilazine sulfoxide when instilled into the eyes of albino rabbits was non-irritating according to accepted criteria for such measurements.

Topical local anesthetic action

Solutions of the test compounds having various concentrations were instilled into the conjunctival sac of the eyes of rabbits and kept in contact with the eye for 1 min. The corneal reflex was then tested at regular intervals. At least two concentrations of each drug were tested in at least three rabbits, and the $ED_{50}$ values, that is the concentration which abolishes the corneal reflex in 50% of the tests, were interpolated from dose-response curves. In this test methdilazine and methdilazine sulfoxide were compared to lidocaine. The results are shown in Table II.

TABLE II

Topical local anesthetic action

| Compound: | $ED_{50}$ (percent w./v.) |
|---|---|
| Methdilazine sulfoxide | >2.0 |
| Methdilazine | 0.08 |
| Lidocaine | 0.14 |

These data indicate that while methdilazine is a strong local anesthetic comparable to lidocaine, methdilazine sulfoxide is substantially without effect on the normal corneal reflex.

CHEMICAL SYNTHESES

Methdilazine sulfoxide may be prepared by oxidation of methdilazine or an acid addition salt thereof according to known methods for the production of sulfoxides from sulfides. Refer, for example, to N. Kharasch "Organic Compounds," Pergamon Press, New York (1961), pp. 157–8. Suitable oxidizing reagents include chromic acid, chromic acid-pyridine mixtures, manganese dioxide, potassium permanganate, and various peroxide compounds including hydrogen peroxide, peracetic acid, performic acid, perbenzoic acid, persalicylic acid, and trifluoroperacetic acid.

The reaction is conducted in a liquid medium under neutral or dilute acid conditions by contacting methdilazine, preferably in solution, with the oxidizing reagent. Mildly acidic conditions offer the advantage of providing a homogeneous reaction solution due to the greater solubility of the hydrochloride or other acid addition salts of both the starting material and product. Preferred reaction conditions include oxidation of methdilazine hydrochloride or other acid addition salt in either aqueous or organic solvent media with aqueous hydrogen peroxide as oxidizing agent. Water or a water miscible organic solvent such as acetone is the preferred reaction medium. The reaction is carried out at room temperature, although somewhat elevated temperatures of up to about 80° C. may be employed.

The product is recovered from the reaction mixture by means of a novel solvent extraction technique. When an aqueous reaction medium or an aqueous organic reaction medium is employed, the product and organic impurities are removed from the reaction medium by extracting with benzene or other water immiscible organic solvent therefor. In those instances where the oxidation is carried out under acidic conditions, neutralization of the reaction mixture resulting in precipitation of the basic components including methdilazine sulfoxide, unreacted methdilazine, if any, and by products, prior to solvent extraction with an immiscible organic solvent is necessary. Separation of pure methdilazine sulfoxide from solvent extracts is extremely difficult if not impossible to accomplish by ordinary methods such as concentration, distillation, and fractional crystallization. Here in lies the problem which is solved as a result of the present invention.

It has been found that methdilazine sulfoxide can be selectively removed from crude solutions thereof in water immiscible organic solvents by extraction with aqueous sodium bisulfite solution. It is not known precisely what function the sodium bisulfite serves, but it is believed that a water-soluble complex or coordination compound between the sodium bisulfite and methdilazine sulfoxide forms. We do not, however, intend to be bound by any theory as to the mechanism by which the process operates. It is simply necessary to contact the organic solvent solution with from 1 to 2 or more molecular proportions of aqueous sodium bisulfite solution. The concentration of sodium bisulfite is not critical, but we have found a 20% solution to be convenient. The sodium bisulfite solvent extraction step is carried out at room temperature or below.

The methdilazine sulfoxide is recovered from the aqueous sodium bisulfite extract by basification thereof with a water soluble base such as sodium or potassium hydroxide and then extraction into a water immiscible organic solvent such as benzene. The product is then separated from this purified benezene extract by conventional means. A convenient recrystallization solvent for final purification is a mixture of ethyl acetate and high boiling petroleum ether. The following procedure is illustrative.

Oxidation method

Methdilazine hydrochloride, 100.0 g., is dissolved in 200 ml. of water in a 400 ml. flask. Hydrogen peroxide (30% aq.), 39.6 g., is added and the mixture is stored at room temperature for 48 hrs. The dark solution is cooled to 10° C. and 16 g. of sodium hydroxide pellets are added. The resulting mixture is saturated with sodium chloride (52.0 g.) and the crude product recovered by extraction with six 100 ml. portions of benzene. The product is then extracted from the benzene solution by washing with 320 ml. of 20% sodium bisulfite solution. After extracting the aqueous bisulfite layer with two 75 ml. portions of fresh bezene, the solution is cooled to 10° C., and added to 300 ml. of 40% aqueous sodium hydroxide. The crude product is again extracted into benzene and the organic phase washed with water. The solvent is removed by distillation at reduced pressure. The residue is dissolved in 145 ml. of hot ethyl acetate, which is allowed to cool to room temperature. The product crystallizes and is collected on a ceramic vacuum filter, washed with ethyl acetate (and dried to constant weight; yield, 67.7 g. (72.5%), M.P. 111.0–112.5° C. The substance is a white crystalline solid which is very soluble in benzene, ethyl acetate, and in water to the extent of 0.5 g./ml. It is insoluble in petroleum ether.

*Analysis.*—Calcd. for $C_6H_{20}N_2OS$ (percent): C, 69.19; H, 6.45; N, 8.97. Found (percent): C, 69.12; H, 6.78; N, 9.03.

Methdilazine sulfoxide hydrochloride is prepared by treating the substance prepared by the preceding method dissolved in moist acetone with hydrogen chloride. It crystallizes from solution as the monohydrate, M.P. 138–141° C. (dec.).

*Analysis.*—Calcd. for $C_{18}H_{20}N_2OS \cdot HCl \cdot H_2O$ (percent): C, 58.92; H, 6.32; N, 7.64, $H_2O$, 4.91. Found (percent): C, 58.51; H, 6.18; N, 7.20; $H_2O$, 5.27.

While several particular embodiments of this invention are shown above, it will be understood, of course, that the invention is not to be limited thereto, since many modifications may be made, and it is contemplated, therefore, by the appended claims, to cover any such modifications as fall within the spirit and scope of this invention.

What is claimed is:
1. The proces for recovering pure methdilazine sulfoxide from the crude reaction product resulting from contacting methdilazine or an acid addition salt thereof in a liquid oxidation medium under conditions ranging from neutral to midly acidic with a sulfoxide-forming oxidant, and thereafter basifying said medium when the oxidation is carried out under acidic conditions which recovery comprises:
   (1) dissolving said reaction product in a water-immiscible organic solvent,
   (2) selectively extracting methdilazine sulfoxide from the resulting solvent solution with an aqueous solution containing from 1 to 2 molecular proportions of sodium bisulfite relative to said methdilazine or acid addition salt thereof, and
   (3) recovering pure methdilazine sulfoxide from the resulting aqueous extract by treatment with a water soluble base, then extraction into a water immiscible organic solvent.

2. The process of claim 1 wherein said crude reaction product is the result of contacting methdilazine hydrochloride with hydrogen peroxide in an aqueous medium.

3. The process of claim 2 wherein said water-immiscible solvent employed in step 1 is benzene.

4. The process of claim 2 wherein said water soluble base employed in step 3 is selected from the group consisting of sodium hydroxide or potassium hydroxide.

References Cited
UNITED STATES PATENTS 2,945,855    7/1960    Feldkamp et al. _____ 260—243
2,863,865    12/1958    Aspergren et al. _____ 260—243

OTHER REFERENCES

Thorne et al. Fritz Ephriam—Inorganic Chemistry, 4th ed., pp. 550–51 (1943), QD151E64aE.

HENRY R. JILES, Primary Examiner

H. I. MOATZ, Assistant Examiner